Jan. 16, 1968  D. V. CRONIN  3,364,359
ELECTRO-OPTICAL ENCODER HAVING TRANSMISSION
VARIATION COMPENSATION
Filed Sept. 29, 1964  2 Sheets-Sheet 1

INVENTOR.
DAVID V. CRONIN
BY
Weingarten, Ovenbuch & Lahive
ATTORNEYS

Jan. 16, 1968             D. V. CRONIN             3,364,359
ELECTRO-OPTICAL ENCODER HAVING TRANSMISSION
VARIATION COMPENSATION
Filed Sept. 29, 1964             2 Sheets-Sheet 2
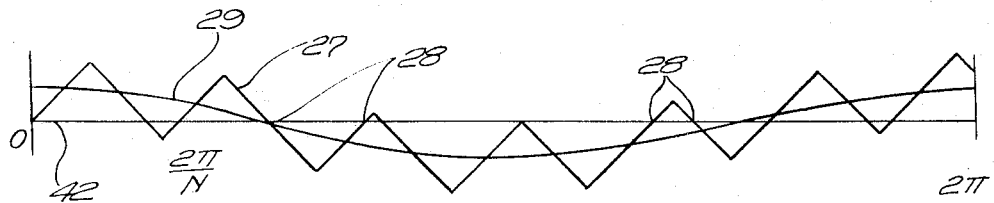
FIG. 2
PRIOR ART       SHAFT ANGLE
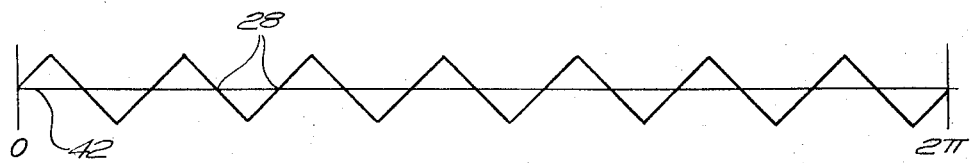
FIG. 4       SHAFT ANGLE
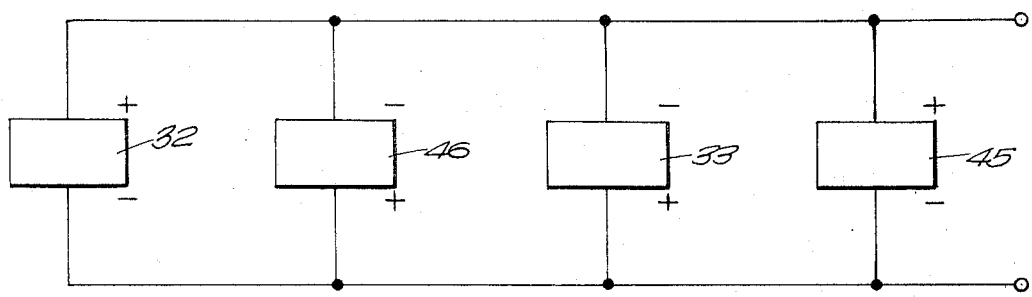
FIG. 5
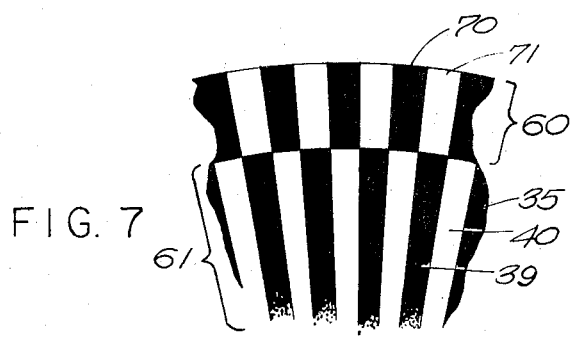
FIG. 7
INVENTOR.
DAVID V. CRONIN
BY Weingarten, Orenbuch & Lahive
ATTORNEYS United States Patent Office 3,364,359
Patented Jan. 16, 1968

3,364,359
ELECTRO-OPTICAL ENCODER HAVING TRANSMISSION VARIATION COMPENSATION
David V. Cronin, West Peabody, Mass., assignor to Dynamics Research Corporation, Stoneham, Mass., a corporation of Massachusetts
Filed Sept. 29, 1964, Ser. No. 400,264
7 Claims. (Cl. 250—231)

ABSTRACT OF THE DISCLOSURE

An electro-optical shaft encoder with compensation for variations in light transmission around the rotating encoder disc. Compensating photosensors are placed adjacent to and are interconnected with the respective signal photosensors which are to be compensated, the outputs of the former being used to cancel errors in the signals due to light transmission variations in the rotating disc.

This invention relates in general to electromechanical transducers and more particularly to an improved photoelectric shaft position encoder, incorporating an electrooptical system, presenting a highly accurate output indication of the amount of rotation of a shaft.

Encoders for providing an output indication of the amount of rotation of a shaft are widely known and may be found incorporated in a wide variety of general positional devices such as inertial navigation equipment and the like. One type of encoder now in use employs a pair of discs each having a series of alternately light transmissive and opaque sectors radially disposed about its center and extending to its periphery. One such disc is mounted on the shaft whose rotation is to be determined while the other disc is mounted concentric with the shaft but mechanically fixed to a reference point. Rotation of the shaft then occasions modulation of a light beam passed through both discs to photosensitive sensors. The electric waveforms at the output of the sensors are indicative of shaft rotation.

If the rotary disc is rotated through an angle equal to an opaque sector, the light pattern will rotate 180°. Rotation of the disc through an additional sector angle returns the pattern to its original position, or in other words, rotates the pattern through a full 360°. Therefore, if the disc rotates 360°, the pattern rotates a number of times equal to the number of opaque sectors N. Thus as the disc rotates, the light transmitted therethrough the modulated to produce from the photocell an electrical signal of characteristic cyclic output having a generally triangular waveform. By detecting the number of times this waveform traverses a reference voltage level, pulses may be generated at the rate of two per cycle.

Such simple encoders do not produce accurate waveforms unless the discs and all the components are exactly positioned. For example, off centering of one of the discs will produce a variation in the reference point crossing of the waveform. This variation is called radial runout and may be compensated for by placing a second light source and sensor 180° from the first light source and sensor. When the two light sources and their respective sensors are perfectly matched and sensors energized in cascade, a triangular waveform having an average DC value of zero is developed at the output. Additional accuracy may be provided by utilizing four light sources and four sensors each displaced 90° from its adjacent source or sensor. Such a device is more fully described in U.S. Patent No. 3,096,444, issued on July 2, 1963.

Such positioning of light sources and sensors cannot, however, compensate for or correct other inaccuracies in the zero crossings of the waveform caused by variation in light transmission of different areas of the rotating disc. If the rotatable disc pattern were perfect and had perfectly homogeneous light transmission properties, the waveform obtained from the photocells would be perfectly periodic, exhibiting identical cycles for each rotational movement of the shaft. The waveform would also be perfectly symmetrical about zero, that is, a Fourier analysis of the waveform vs. shaft angle would have no DC or even harmonic terms in the period.

However, even if the geometry of the rotary disc pattern remains perfect but variations occur in the opacity of the dark sectors or clarity of the clear sectors, lower frequency harmonic components are added to the signals generated.

The present invention has been designed to compensate and eliminate this error in the output signal by providing additional photocells in the field of the illumination of the rotary disc. These cells will generate a signal proportional to the difference in transmission of areas of the rotary disc or, in other words, generate a signal which is an approximation of the error term. Appropriate interconnections of the cells will, therefore, result in perfect cancellation of the error to result in an output waveform that is perfectly periodic and symmetrical about zero.

The present invention, therefore, provides a means of sensitivity compensation for such rotary encoders and further provides an encoder having output waveforms hitherto unavailable. Other advantages and features of the present invention will become apparent from the following detailed description when taken in conjunction with the accompanying drawings in which:

FIG. 2 is a plot of the channel waveform vs. the shaft angle obtained from the device shown in FIG. 1;

FIG. 4 is a plot of the channel waveform vs. shaft angle obtained with the device shown in FIG. 3;

FIG. 5 is a schematic of a typical electrical interconnection of the photocells in accordance with the teachings of the present invention; and FIGS. 6 and 7 illustrate additional embodiments of the present invention.

Figure 1:
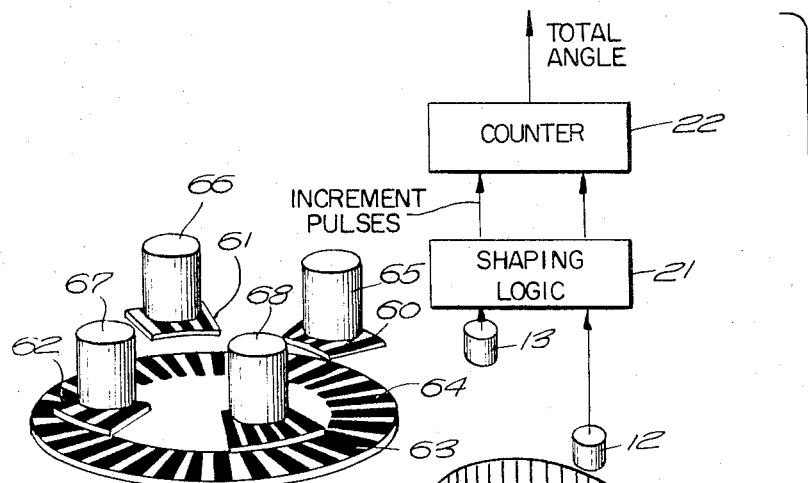
FIG. 1 is a simplified schematic of a prior art optical encoder.

The single channel optical encoder shown schematically in FIG. 1 has two light sources 10 and 11 placed 180° apart and aligned with corresponding photosensors 12 and 13. Interposed between the source 10 and 11 and the sensors 12 and 13 are two transparent discs 14 and 15 having ruled patterns of opaque sectors 16 and 17 and alternating clear sectors 18 and 19 respectively. One disc 14 is mounted on the rotating shaft 20, the other disc 15 is fixed to the housing 25. When the anchored disc has one more opaque sector than the rotating disc, a moiré fringe is generated because maximum light is transmitted through one region of the disc while 180° away the illumination is at a minimum. One full revolution of the input shaft 20 causes the moiré pattern to rotate N times, where N equals the number of opaque sectors on the rotating disc, thus providing an optical gearing effect and causing each sensor to put out a characteristic waveform corresponding to the moiré pattern.

By appropriate interconnection of the sensors 12 and 13 and feeding of their output to shaping and logic circuits 21, the variant illumination can be converted to pulse trains. Depending upon the output circuit used, 1 or more pulses are generated for each full revolution of the moiré pattern. Thus, an optical encoder system can produce up to four N pulses for each shaft revolution. If desired, the circuit 21 can be provided with two output leads and a common ground in order that pulses produced by clockwise shaft rotation will appear on one lead and those produced by counterclockwise rotation will appear on the other. These signals can be fed to a simple up and down counter 22 in order to generate a total angle code and, if desired, a zero reference signal can also be supplied on a separate signal circuit (not shown) for initiating or checking count.

As previously mentioned, if the rotatable disc pattern had perfectly homogeneous light transmission properties, a waveform obtained from the photocell pair, would be perfectly periodic and exhibit N identical electrical cycles per turn of the shaft and be perfectly symmetrical about zero. That is, it would be a Fourier analysis of the waveform vs. shaft angle and would have no lower frequency components.

Such discs, however, do have variations in the opacity of the dark sectors or in the clarity of the clear sectors. The general effect of these is to add a low frequency harmonic or error component. This effect is illustrated in FIG. 2.

A study of FIG. 2 shows clearly that the zero crossings 28 of the waveform 27 are severely perturbed by the presence of a low frequency component 29. This error producing effect is compensated for by the present invention either by detecting such low frequency transmission variation of waveform 29 and substracting it from the channel waveform 27, or by positioning the photocells such that the effect is eliminated.

Figure 3:
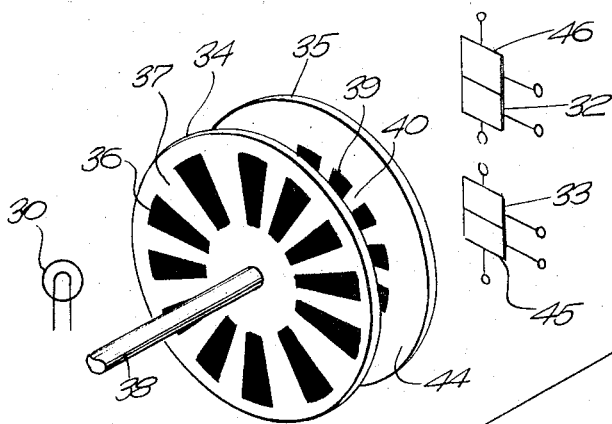
FIG. 3 is an illustration in perspective of one embodiment of an improved transducer constructed in accordance with the principles of this invention.

One device providing such correction or error compensation is more fully described in conjunction with FIG. 3.

Basically, the error compensation of such optical encoders may be obtained by providing a second pair of photosensitive elements adjacent to the original cells and illuminated by light transmitted through only the rotary disc. Viewing FIG. 3, which shows an encoder having such a compensation means, we observe that the device comprises a pair of light sources 30 and 31 placed 180° apart and having respective photosensors 32 and 33. Interposed between the sources and their respective sensors are two discs 34 and 35. Disc 34 carries a plurality of alternately dark sectors 36 interposed with clear transparent spaces 37 and is mounted on a rotary shaft input 38. The second disc 35 also has a plurality of alternately dark sectors 39 and transparent spaces 40. Thus, the device is substantially identical to the device of FIG. 1 and basically operates in the same manner to produce a moiré fringe and a cyclic output waveform. Because some of dark sectors 36 or 39 vary in density and some of the transparent sectors 37 or 40 vary in clarity, a low frequency component is added to the signal generated by the photocells 32 and 33 as illustrated in FIG. 2.

To compensate for this error, the fixed disc 35 is made so that an extensive zone, illustrated here as the annular zone 44, is totally transparent and additional photocells 45 and 46 are placed radially adjacent to the original photocells 32 and 33. The cells 45 and 46 are illuminated by lamps 30 and 31 through rotary disc 34, and the transparent zone 44 of disc 35. Since these additional photocells 45 and 46 do not have alternately dark and clear sectors opposite to them in the stationary reticle 35, they cannot generate a moiré pattern, but they can and do generate a signal proportional to the difference in transmission of disc 34. In other words, they see a good approximation of the error term or curve 29 indicated in FIG. 2.

The choice of the position of the compensating cells 45 and 46 has a significant influence upon their effectiveness. They can be located in either one of two ways. Firstly, they can be at the same angular position as the original cells 32 and 33 but at a different radius, which is illustrated in FIG. 3, or can be located at the same radius but at different angular positions.

The first-described arrangement of the photocells has been found to be superior in practice because the radial homogeneity of the rotary disc 34 is usually quite good while the transverse homogeneity varies. Thus, in practice, dual photocells are placed radially adjacent one another and 180° from another pair and in line with the transparent sector 44 of stationary reticle 35 to provide an output signal of the channel waveform vs. the shaft angle as depicted in FIG. 4 in which the error term 29 has been eliminated.

FIG. 5 depicts in schematic form how the compensation is provided by the additional photocells 45 and 46. The oppositely phased photocells 32 and 33 are subjected to illumination which when passed through the reticle patterns of both the rotary disc 34 and the stationary disc 35, produces the output signal of period $2\pi/N$ plus the error signal. Simultaneously, photocells 45 and 46 are subjected to illumination passing through the reticle pattern of rotary disc 34 and the transparent sector 44 of disc 35 to produce only the low frequency component. All these signals can be appropriately coupled, as indicated in FIG. 5, in order to eliminate the error introduced by difference in opacity of various portions of the disc 34.

Figure 6:
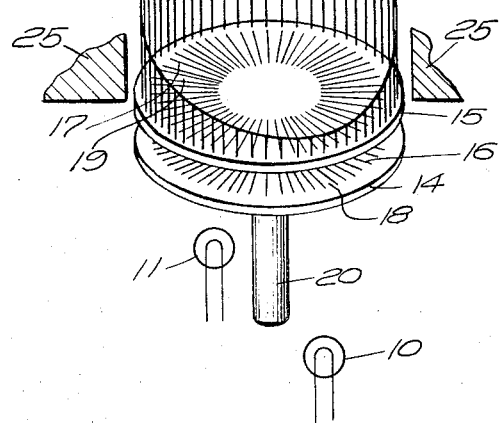

Another encoder constructed to eliminate radial runout errors and errors due to variation in light transmission around the periphery is illustrated in FIG. 6. In this embodiment the error compensating photocells are placed radially in line with the original photocells and the stationary disc, which has a pattern identical to that of the rotary disc, is skewed to produce an interference pattern whose fringes move radially when the rotary disc turns. In this way, the compensating cells produce a useful signal in addition to the error compensation signal. Further, as illustrated, an entire stationary disc need not be used, and small reticle patches serve as the stationary disc.

In FIG. 6 the stationary reticle is replaced by a plurality of individual patches 60, 61, 62 and 63 fixedly secured to the housing. These patches utilize the same angular sectors as provided on the rotary disc 64. These patches need only to extend across the photosensor containers 65, 66, 67 and 68. When such patches are used in conjunction with the error compensation aspect of the previously described embodiment, a significant improvement is realized.

This improvement is accomplished by placing dual sensor elements, in the manner set forth in FIG. 3 in each sensor container 65, 66, 67 and 68 and skewing the patches 60, 61, 62 and 63. When the patches are so skewed, there is produced a moiré interference pattern which moves radially, thus one sensor in the container, namely, the one closest to the periphery, sees an interference pattern which is 180° out of phase from the interference pattern seen by its companion photosensor closer to the center of the disc. In this instance DC coupling the outputs from one radial pair produces a waveform independent of light transmission variation but sensitive to radial runout. By coupling the output so desired from each diametrically opposed pair, a waveform compensated for errors of both types is produced.

Still another embodiment is depicted in FIG. 7 wherein the peripheral transparent sector 44 of FIG. 3 is replaced by alternately opaque and transparent sectors 70 and 71 which are shifted 180° from the alternate sectors 39 and 40. This embodiment also produces a moiré fringe which moves radially and may be utilized in the manner previously described in FIGS. 3 and 6 to produce an error free signal output.

Still other modifications may become apparent to one skilled in the art without departing from the inventive concepts. Consequently, the invention is to be construed as limited only by the spirit and scope of the appended claims.

What is claimed is:

1. An electro-optical transducer comprising means for transmitting a plurality of light beams, a plurality of means responsive to said beams, means interposed between said transmitting means and said responsive means, said interposed means comprising a first and second reticle, each having a plurality of alternately light transmissive and light opaque sectors, means for rotating said first reticle and means for fixedly maintaining said second reticle in parallel relation to said first reticle, said responsive means comprising at least four sensors arranged in pairs, one of said pairs being positioned 180° from the other of said pairs and the two photosensors in each pair being adjacent and interconnected, means for interconnecting said pairs, said interconnections correcting for radial runout and transparency variations in said reticles.

2. An electro-optical transducer comprising means for transmitting a plurality of light beams, a plurality of means responsive to said beams, means interposed between said transmitting means and said responsive means, said interposed means comprising a first and second reticle, each of said reticles having a plurality of alternately light transmissive and light opaque sectors, means for rotating said first reticle and means for fixedly maintaining said second reticle in parallel relation to said first reticle with said opaque sectors of said second reticle skewed with respect to said opaque sectors of said first reticle, said responsive means comprising at least four sensors arranged in pairs, the two photosensors in each pair being adjacent and interconnected, one of said pairs being positioned 180° from the other of said pairs, and means for interconnecting said sensors to correct for radial run-out and transparency variations.

3. An electro-optical transducer comprising means for transmitting a plurality of light beams, a plurality of means responsive to said beams, means interposed between said transmitting means and said responsive means, said interposed means comprising a first and a second reticle, each having a plurality of alternately light transmissive and light opaque sectors, and means for rotating said first reticle and means for fixedly maintaining said second reticle in parallel relation to said first reticle, said second reticle having concentric first and second annular sections of said alternate sectors, said second annular section being circumferentially shifted by the width of one opaque sector with respect to said first annular section, said responsive means comprising at least four sensors arranged in pairs, the two photosensors in each pair being interconnected and adjacent with one photosensor being in registration with said first annular section and the other just being in registration with said second annular section, one of said pairs being positioned 180° from the other of said pairs.

4. An electro-optical transducer comprising first and second discs having a common axis, each of said discs having a plurality of equiangular light transmissive and light opaque sectors, said second disc having an extensive annular transmissive portion, means for directing a light beam through both of said discs, first means responsive to light from said beam transmitted through said alternately transmissive and opaque sectors of both of said discs and second means responsive to light transmitted from said beam through said alternately transmissive and opaque sectors of said first disc and through the extensive annular transmissive portion of said second disc, said first light responsive means providing an output signal in response to light from said beam transmitted through alternately opaque and transparent sectors of both of said discs and said second light responsive means providing an output signal in response to light transmitted through the alternately opaque and transparent sectors of said first disc and the extensive annular transmissive portion of said second disc and connecting means interconnecting the output signals from said first and said second means.

5. An electro-optical transducer comprising a first and a second reticle, said first reticle being a disc having radially disposed alternately light transmissive and light opaque sectors, said second reticle being a disc having two annular sections, one section having alternately light transmissive and light opaque sectors and the other section being entirely light transmissive, means for directing dual parallel light beams through both of said reticles, said beams being spaced 180° apart, first light responsive means positioned in said light beams with said reticles interposed between said responsive means and said light directing means, said responsive means each comprising a pair of photosensors, one photosensor being responsive to light from said beam transmitted through said alternately light transmissive and light opaque sectors of both of said reticles and a second sensor responsive to light transmitted through the alternately light transmissive and light opaque sector of said first reticle and the entirely light transmissive section of said second reticle, each of said sensors in a pair being connected to one another to provide a single error-free output signal, means for connecting the output of each of said responsive means to provide a single signal having a period of $2\pi/N$ when N is the number of alternate sectors provided on said first reticle.

6. An electromechanical transducer comprising a first and a second reticle, said first reticle being a rotatable disc having radially disposed alternately light transmissive and light opaque sectors, said second reticle arranged in two concentric annular sections, each having alternately light transmissive and light opaque sectors one annular section being shifted with respect to the other, means for directing dual parallel light beams through both of said reticles, said beams being spaced 180° apart, first and second light responsive means positioned in registration with said light beams, said responsive means each comprising a pair of adjacent photosensors, one photosensor of each pair being responsive to the light beam transmitted through said first reticle and the first annular section of said second reticle, the other sensor being responsive to light transmitted through said first reticle and the second annular section of said second reticle, said photosensors providing output signals, means for interconnecting said photosensors in each pair to provide a single transparency variation compensated output signal, and means for interconnecting said first light responsive means to said second light responsive means to couple together said output signals with said photosensor pairs to provide a single output signal having the period of $2\pi/N$ where N is the number of alternate sectors provided on said first reticle.

7. An electro-optical transducer comprising a first and a second reticle, said reticles having alternately light transmissive and light opaque sectors, means on one side of said reticle for directing dual parallel light beams normal to both of said reticles, said beams being spaced 180° apart, said second reticle being fixedly positioned parallel to said first reticle and having its alternate sectors skewed with respect to said alternate sectors of said first reticle, first and second light responsive means positioned on the side of said reticles opposite said light directing means and in registration with said light beams, said responsive means each comprising a pair of radially displaced photosensors, means interconnecting the photosensors in each pair to provide a single output signal from each pair in response to light transmitted through said reticles and means interconnecting said responsive means to provide a single output signal having a period equal to $2\pi/N$ where N is the number of opaque sectors on said first reticle.

References Cited

UNITED STATES PATENTS

| | | | |
|---|---|---|---|
| 2,945,167 | 7/1960 | Gunther | 250—231 |
| 3,014,134 | 12/1961 | Bower | 250—237 |
| 3,175,093 | 3/1965 | De Lang | 250—237 |
| 3,193,744 | 7/1965 | Seward | 250—233 |
| 3,238,375 | 3/1966 | Johnson | 250—231 |

RALPH G. NILSON, *Primary Examiner.*

J. D. WALL, *Assistant Examiner.*

UNITED STATES PATENT OFFICE
CERTIFICATE OF CORRECTION

Patent No. 3,364,359                    January 16, 1968

David V. Cronin

It is certified that error appears in the above identified patent and that said Letters Patent are hereby corrected as shown below:

Column 1, line 50, "the", first occurrence, should read -- is --.  Column 6, line 12, "sector" should read -- sectors --; line 26, after "other" insert -- by an amount equal to one opaque sector --.

Signed and sealed this 3rd day of March 1970.

(SEAL)

Attest:

Edward M. Fletcher, Jr.

Attesting Officer

WILLIAM E. SCHUYLER, JR.

Commissioner of Patents